(12) United States Patent
Baumert et al.

(10) Patent No.: US 12,450,254 B2
(45) Date of Patent: Oct. 21, 2025

(54) DATABASE DATA REPLICATION TOOL

(71) Applicant: ADP, INC., Roseland, NJ (US)

(72) Inventors: Yoann Baumert, Nanterre (FR);
Clement Delaunay, Nanterre (FR);
Daniel-Florin Chis, Nanterre (FR)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 18/113,982

(22) Filed: Feb. 24, 2023

(65) Prior Publication Data

US 2024/0020314 A1 Jan. 18, 2024

Related U.S. Application Data

(63) Continuation of application No. 17/099,059, filed on Nov. 16, 2020, now abandoned.

(51) Int. Cl.
| | |
|---|---|
| *G06F 15/16* | (2006.01) |
| *G06F 9/455* | (2018.01) |
| *G06F 9/50* | (2006.01) |
| *G06F 16/22* | (2019.01) |
| *G06F 16/23* | (2019.01) |

(Continued)

(52) U.S. Cl.
CPC .......... *G06F 16/27* (2019.01); *G06F 9/45558* (2013.01); *G06F 9/5016* (2013.01); *G06F 9/5083* (2013.01); *G06F 16/2282* (2019.01); *G06F 16/2358* (2019.01); *G06F 16/258* (2019.01); *G06F 2009/45583* (2013.01)

(58) Field of Classification Search
None
See application file for complete search history.

(56) References Cited

U.S. PATENT DOCUMENTS

| | | |
|---|---|---|
| 10,346,360 B1 | 7/2019 | Basov |
| 10,901,973 B1 | 1/2021 | Senra et al. |
| 2001/0032205 A1 | 10/2001 | Kubaitis |

(Continued)

FOREIGN PATENT DOCUMENTS

| | | |
|---|---|---|
| EP | 3 495 961 A1 | 6/2019 |

OTHER PUBLICATIONS

International Preliminary Report on Patentability issued in corresponding International Application No. PCT/US2021/046404, dated May 25, 2023 (7 pages).

(Continued)

*Primary Examiner* — Alex Gofman
(74) *Attorney, Agent, or Firm* — Foley & Lardner LLP (57) ABSTRACT

Data replication between databases is provided. The method comprises receiving, through an API integrated into a data replication tool, a request from a system of record (SoR) application for a replication setup and initialization. A number of data instances are imported through the API from a source database associated with the SoR. A manager engine integrated into the data replication tool initiates a separate replication process for each data instance. The manager engine is configured to support multiple data instances on a single virtual machine instance. If a difference between a data description language (DDL) of the replicated data instances and a DDL of a target database is detected, the DDL of the replicated data instances is automatically changed to the DDL of the target database. The replicated data instances are then exported to the target database.

18 Claims, 7 Drawing Sheets

(51) Int. Cl.
   *G06F 16/25*   (2019.01)
   *G06F 16/27*   (2019.01)

(56) References Cited

U.S. PATENT DOCUMENTS

| | | |
|---|---|---|
| 2009/0089619 A1 | 4/2009 | Huang et al. |
| 2011/0010379 A1* | 1/2011 | Gilderman ............ G06F 16/252 |
| | | 707/769 |
| 2015/0249769 A1 | 9/2015 | Asahara |
| 2016/0154627 A1 | 6/2016 | Chandra et al. |
| 2016/0292250 A1 | 10/2016 | Chen et al. |
| 2017/0068718 A1 | 3/2017 | Schaffer |
| 2018/0173594 A1* | 6/2018 | Rosier .................... G06F 16/27 |
| 2018/0232382 A1 | 8/2018 | Mayer et al. |
| 2018/0285353 A1 | 10/2018 | Ramohalli Gopala Rao et al. |
| 2019/0057163 A1 | 2/2019 | Thomas |
| 2019/0325055 A1 | 10/2019 | Lee et al. |
| 2020/0117680 A1 | 4/2020 | Bapat et al. |

OTHER PUBLICATIONS

International Search Report and Written Opinion issued in corresponding International Application No. PCT/US2021/046404, dated Dec. 6, 2021 (9 pages).
US Office Action issued in corresponding U.S. Appl. No. 17/099,059, dated Jul. 25, 2022 (14 pages).
US Office Action issued in corresponding U.S. Appl. No. 17/099,059, dated Jun. 7, 2022 (13 pages).
US Office Action issued in corresponding U.S. Appl. No. 17/099,059, dated Nov. 30, 2022 (16 pages).
US Office Action issued in corresponding U.S. Appl. No. 17/099,059, dated Sep. 8, 2022 (14 pages).

* cited by examiner

| | Database Name | Schema Name | Environment | Replication | Replication Status | OnBoarding | OnBoarding Status | Delete |
|---|---|---|---|---|---|---|---|---|
| | UAT1_ROTHSCHILD_SO | emea_reg0439 | UAT1 | REMOVE | RUNNING 290192/290192 | STOP | COMPLETED (100%) | DELETE |
| | EMEAUAT1ASWATH | emea_reg0440 | UAT1 | REMOVE | RUNNING 3/3 | STOP | COMPLETED (100%) | DELETE |
| | UAT1_JHCM10880_VANILLA | emea_reg0441 | UAT1 | REMOVE | RUNNING 253593/253593 | STOP | COMPLETED (100%) | DELETE |
| | UAT1_JHCM30826_ITA_IRCE | emea_reg0455 | UAT1 | REMOVE | RUNNING 256215/256215 | STOP | COMPLETED (100%) | DELETE |
| | ESUAT1 | emea_reg0416 | UAT1 | REMOVE | RUNNING 290652/290649 | STOP | COMPLETED (100%) | DELETE |
| | ES_UAT1_JENNIE | emea_reg0200 | UAT1 | REMOVE | RUNNING 290752/290752 | STOP | COMPLETED (100%) | DELETE |

HOME
DATABASES »
ENVIRONMENTS »
ADMINISTRATION »
ACTION PAGE
INFORMATION
FAQ »
CONFIGURATION »
LOG OUT

FIG. 8

DATABASE DATA REPLICATION TOOL

CROSS-REFERENCE TO RELATED APPLICATIONS

This application priority and benefit under 35 U.S.C. § 120 as a continuation of U.S. Ser. No. 17/099,059, filed Nov. 16, 2020, the contents of which are is hereby incorporated by reference herein in its entirety.

BACKGROUND INFORMATION

1. Field

The present disclosure relates generally to an improved computer system and, in particular, to replication data for communication between a database and another database or messaging system.

2. Background

Moving data across heterogeneous system typically requires replication, filtering, and of transformation of the data. The heterogeneous systems might comprise different databases. Specialized data replication tools can be employed to facilitate this data replication between systems. However, these replication tools are often complex, expensive, and require continual maintenance work.

SUMMARY

An illustrative embodiment provides a computer-implemented method for data replication between databases. The method comprises receiving, through an application programming interface (API) integrated into a data replication tool, a request from a system of record (SoR) application for a replication setup and initialization. A number of data instances are imported through the API from a source database associated with the SoR. A manager engine integrated into the data replication tool initiates a separate replication process for each data instance. The manager engine is configured to support multiple data instances on a single virtual machine instance. If a difference between a data description language (DDL) of the replicated data instances and a DDL of a target database is detected, the DDL of the replicated data instances is automatically changed to the DDL of the target database. The replicated data instances are then exported to the target database.

Another illustrative embodiment provides a system for data replication between databases. The system comprises a storage device configured to store program instructions and one or more processors operably connected to the storage device and configured to execute the program instructions to cause the system to: receive, through an application programming interface (API) integrated into a data replication tool, a request from a system of record (SoR) application for a replication setup and initialization; import, through the API, a number of data instances from a source database associated with the SoR; initiate, by a manager engine integrated into the data replication tool, a separate replication process for each data instance imported through the API, wherein the manager engine is configured to support multiple data instances on a single virtual machine instance; if a difference between a data description language (DDL) of the replicated data instances and a DDL of a target database is detected, automatically change the DDL of the replicated data instances to the DDL of the target database; and export the replicated data instances to the target database.

Another illustrative embodiment provides a computer program product for data replication between databases. The computer program product comprises a computer-readable storage medium having program instructions embodied thereon to perform the steps of: receiving, through an application programming interface (API) integrated into a data replication tool, a request from a system of record (SoR) application for a replication setup and initialization; importing, through the API, a number of data instances from a source database associated with the SoR; initiating, by a manager engine integrated into the data replication tool, a separate replication process for each data instance imported through the API, wherein the manager engine is configured to support multiple data instances on a single virtual machine instance; if a difference between a data description language (DDL) of the replicated data instances and a DDL of a target database is detected, automatically changing the DDL of the replicated data instances to the DDL of the target database; and exporting the replicated data instances to the target database.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that moving data across heterogeneous system such as databases typically requires specialized tools for the replication, filtering, and of transformation of the data.

The illustrative embodiments also recognize and take into account that these specialized data replication tools are often complex, expensive, and require continual maintenance work.

The illustrative embodiments provide a data replication tool that can replicate data in real time and replicate DDL changes. The replication tool is manageable through an integrated application protocol interface (API) and user interface (UI). Data replication, onboarding, and orchestration processes can use the API to push notifications to a messaging system to provide information, warnings, and alerts in real time regarding events requiring attention.

Figure 1:
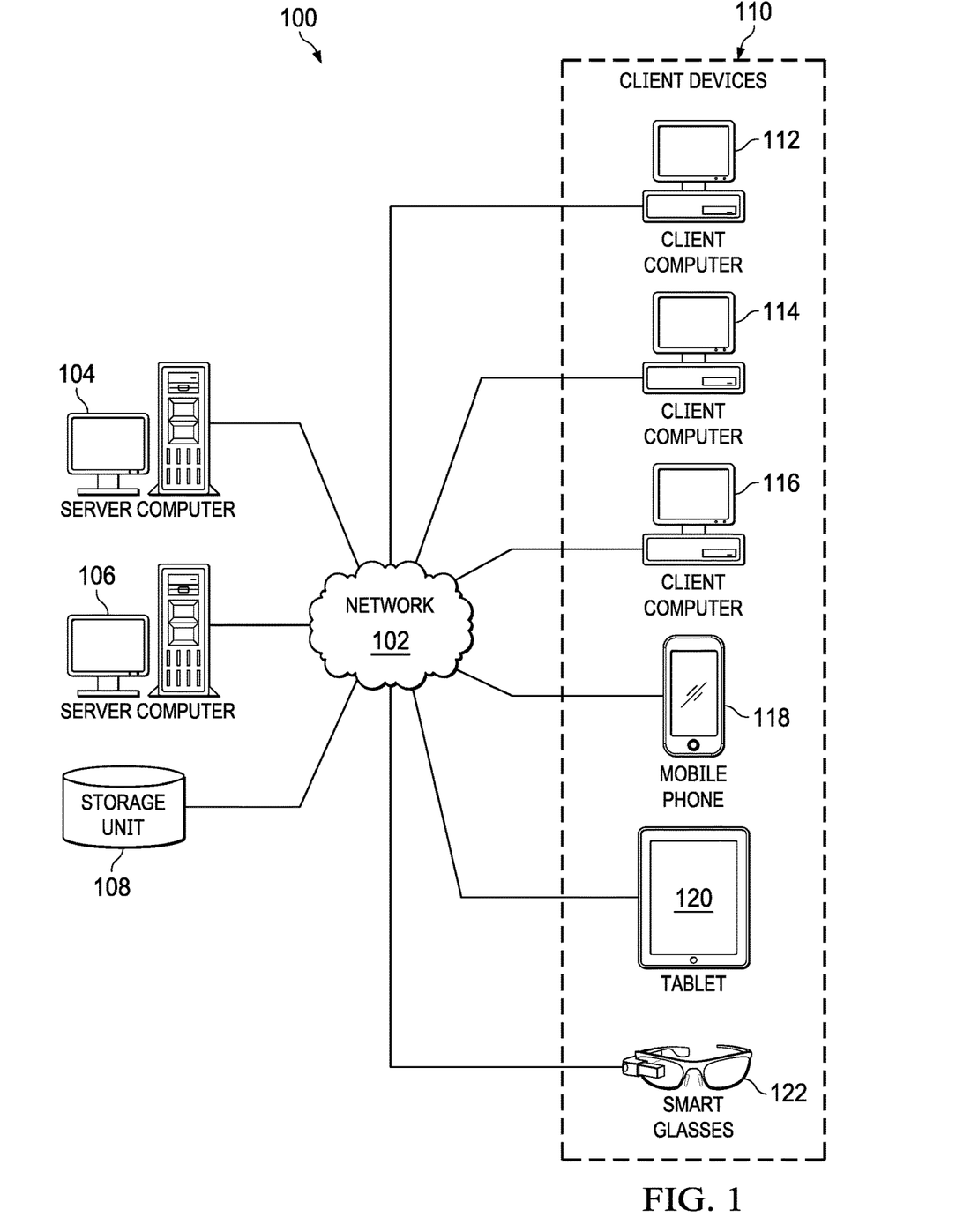
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
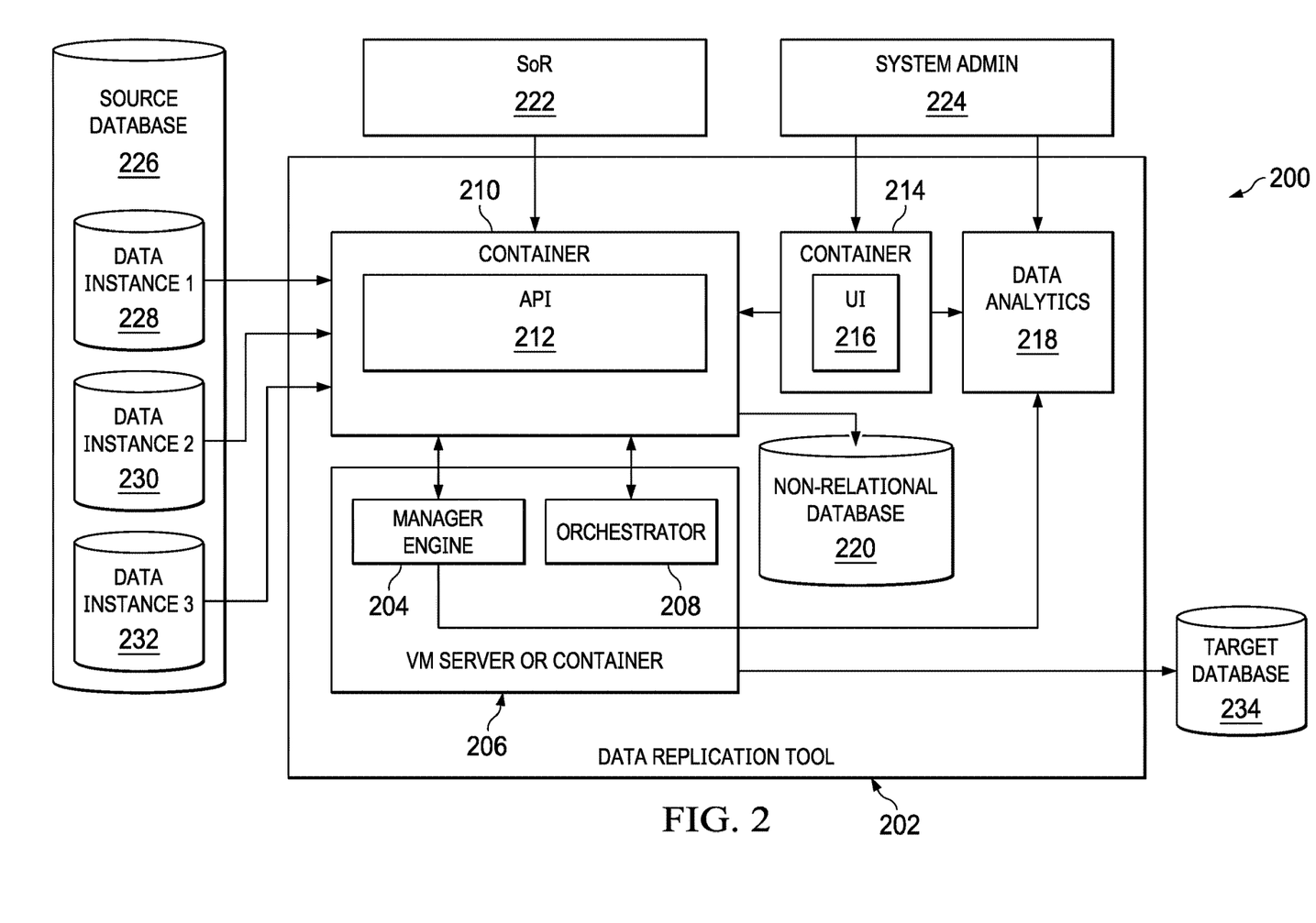
FIG. 2 is an illustration of a block diagram of a data replication system in accordance with an illustrative embodiment.

Turning to FIG. 2, a block diagram of a data replication system is depicted in accordance with an illustrative embodiment. Data replication system 200 might be implemented in network data processing system 100 in FIG. 1.

Data replication system 200 comprises a data replication tool 202 that replicates data between heterogeneous source 226 and target 234 databases. The databases might comprise, e.g., a human capital management (HCM) database 226 and datacloud 234, but data replication system 200 can be used with other types of databases and messaging systems. Data replication tool 202 might be integrated with a live stream chat system (e.g., WebEx) and used to push live information about a user's status and database status.

Manager engine 204 within data replication tool 202 is able to support multiple data instances 228, 230, 232 on a single virtual machines (VM) server or container 206. A VM is a virtual machine that emulates a computer system in software to provide the functionality of a physical computer. VMs can run Java programs as well as programs written in other languages that are compiled to Java bytecode.

The user can define the scope of instances managed by manager engine 204 on VM instance 206. For example, the scope might comprise all data instances within a specified category (e.g., Production) or it might define X specific data instance.

Control of data replication occurs through an application programming interface (API) 212 that is integrated with data replication tool 202. API 212 might run on container 210. API 212 receives requests for replication setup and initialization from a system of record (SoR) 222 and imports data instances 228, 230, 232 from the source database 226 associated with SoR 222.

A system administrator 224 is able to access API 212 through user interface (UI) 216, which is also integrated into data replication tool 202 might run on its own container 214. The system administrator 224 is also able to monitor data analytics 218 (e.g., Splunk) provided replication logs by the manager engine 204 in real-time during data replication operations. Replication logs might also be provided to data analytics 218 by UI 216.

Non-relational (i.e. non-SQL) database 220 stores the last time a data replication was successful for a specific table.

System administrator 224 can use UI 216 to instruct the data replication tool 202 to start a new replication from this previous time/date by changing the date and clicking update.

Data replication tool 202 might also comprises an internal orchestrator 208 to plan and execute a specified list of actions by manager engine 204 under specified conditions (e.g., at a specified time) and can be managed from UI 216.

In an embodiment, manager engine 204 might be one of a number of manager engines in a load balancing cluster in which a number of tasks are distributed across a set of engines to avoid situations in which some engines are overloaded while leaving other engines idle.

Data replication system 200 can be implemented in software, hardware, firmware or a combination thereof. When software is used, the operations performed by data replication system 200 can be implemented in program code configured to run on hardware, such as a processor unit. When firmware is used, the operations performed by data replication system 200 can be implemented in program code and data and stored in persistent memory to run on a processor unit. When hardware is employed, the hardware may include circuits that operate to perform the operations in data replication system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein a processor is comprised of hardware circuits such as those on an integrated circuit that respond and process instructions and program code that operate a computer. When a number of processors execute instructions for a process, the number of processors is one or more processors can be on the same computer or on different computers. In other words, the process can be distributed between processors on the same or different computers in computer system. Further, the number of processors can be of the same type or different type of processors. For example, a number of processors can be selected from at least one of a single core processor, a dual-core processor, a multi-processor core, a general-purpose central processing unit (CPU), a graphics processing unit (GPU), a digital signal processor (DSP), or some other type or processor.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

Figure 3:
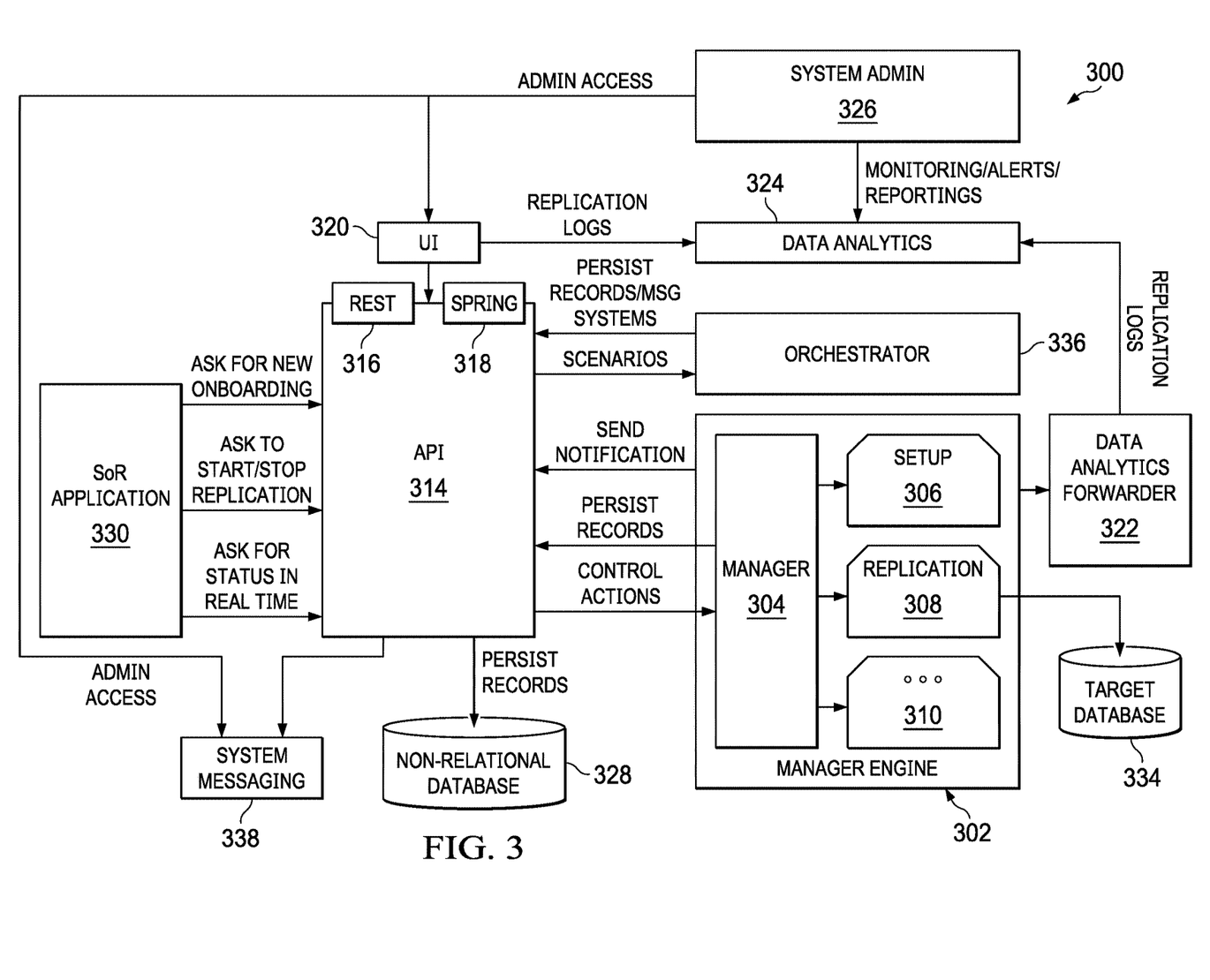
FIG. 3 depicts the data replication tool responding to requests from an SoR application in accordance with an illustrative embodiment.

FIG. 3 depicts the data replication tool responding to requests from an SoR application in accordance with an illustrative embodiment. Architecture 300 might be an example of a more detailed view of data replication tool 202 in FIG. 2.

The database owner can use SoR application 330 to make several requests to API 314. These requests might include new onboarding of data, requests to start or stop data replication, and requests for status of data replication in real-time.

API 314 might comprise a representational state transfer (REST) software architecture 316 that can be constructed within a Spring framework 318. API 314 enables any remote component to start actions on the replication side. Examples of these actions might include client onboarding (setup process to build the replication, e.g., schema creation, Init load, CDC enablement, etc.), data replication administrative tasks (start/stop, cancel, setup, etc.), providing onboarding, and replication real-time status.

API 314 provides control actions to a manager 304 within the manager engine 302. Manager 304 controls the actions of manager engine 302 including setup 306, replication 308, and other operations 310. Replicated data from replication 308 can be forwarded to target database 334.

The other operations 310 performed by manager engine 302 might comprise actions that can be performed automatically by manager 304, manual actions requested by system administrator 326 or SoR 330, and time-scheduled actions to be executed at specific times of day, which can be monitored by orchestrator 336.

Examples of actions performed automatically by manager include cluster management to redistribute load between cluster nodes, analyze if any replications are up and running, control source performance consumed by the replication process (e.g., statistics, alerts, and reports if the source cannot handle the connections in time), and controlling the health of the system such as RAM, load averages, disk spaces, and CPU function.

Examples of manual actions include client setup, client deletion, full data reloads, partial data reloads on selected tables, and optimized reloaded only on tables used by the clients.

Some actions might be executed automatically by the manager 304 at specific times according to authorized time slots, but administrator 326 or SoR 330 can manually send a request for an action to be executed immediately. Examples of this type of action might include starting/stopping replication, control and fix connected device configuration (CDC) problems, controlling data compliancy on tables being replicated and correcting any mismatches, analysis and update of SQL server connection strings, and custom actions by the SoR.

API 314 also receives persist records from manager 304 and persists them on a non-relational database (e.g., MongoDB) 328.

Data analytics forwarder 322 forwards replication logs from manager engine 302 to data analytics (i.e. Splunk) 324 in real-time. Data analytics 324 can be access by system administrator 326 for monitoring, alerts, and reporting. System administrator 326 also had administrative access to API 314 through integrated UI 320. UI 320 might also be used to provide replication logs to data analytics 324.

UI 320 can be used to plan and create scenarios that comprise lists of tasks to be performed under specified conditions. Orchestrator 336 in manager engine 302 regularly checks if any of the planned scenarios must be run. If manager engine 302 executes a scenario, it can inform the system administrator 326 in real-time over email or messaging system 338 through API 314. Manager engine 302 can send notifications to system messaging 338 to provide system administrator 326 information, warnings, and alerts in real time regarding events requiring attention.

Figure 4:
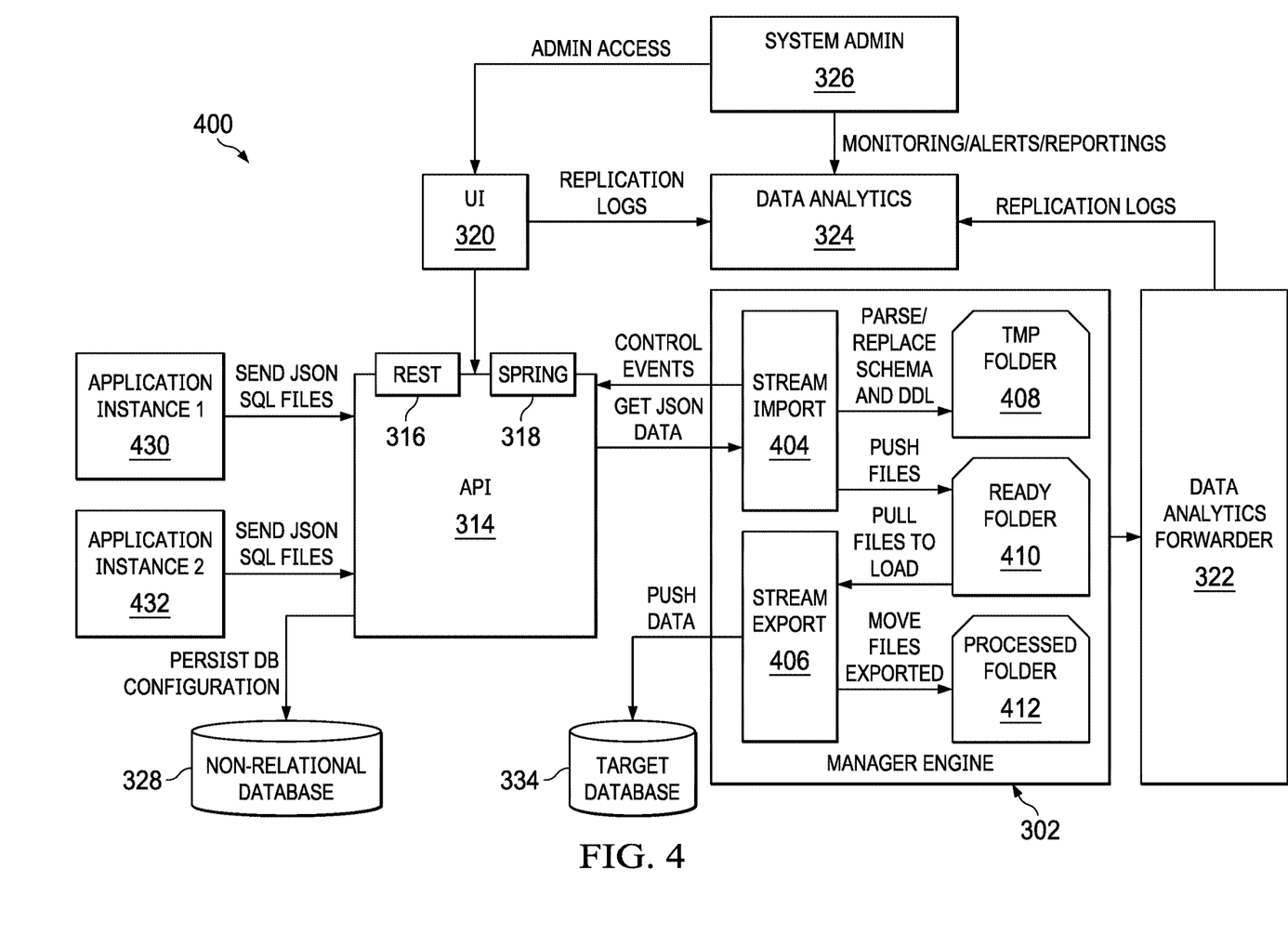
FIG. 4 depicts the operation of a data stream through the data replication tool in accordance with an illustrative embodiment.

FIG. 4 depicts the operation of a data stream through the data replication tool in accordance with an illustrative embodiment. Data stream operation 400 can be implements in architecture 300 shown in FIG. 3.

In the present example, application instance 1 430 and application instance 2 432 send JavaScript object notation (JSON) SQL files to API 314.

Stream import 404 in manager engine 302 receives the JSON data through the API 314. Stream import 404 parses and schema and data description language (DDL) of the JSON data replaces it if necessary and stores the data in a temporary folder 408. When the data is ready for export to the target database 434, stream import 404 pushes the files to ready folder 410.

Stream export 406 then pulls files to be loaded from ready folder 410 and pushes the data to target database 334. Stream export 406 then moves files to processed folder 412 after they have been exported to target database 334.

API 314 persists the database configuration information on non-relational database 328. The database configuration might comprise, e.g., source/target information to replicate, status of the databases, database owner, last time an action has been done on the database and by whom, and number of data at source and target to detect mismatches. Manager engine 302 forwards logs to data analytics 324 that can be monitored by system administrator 326 and acted upon through UI 320.

Figure 5:
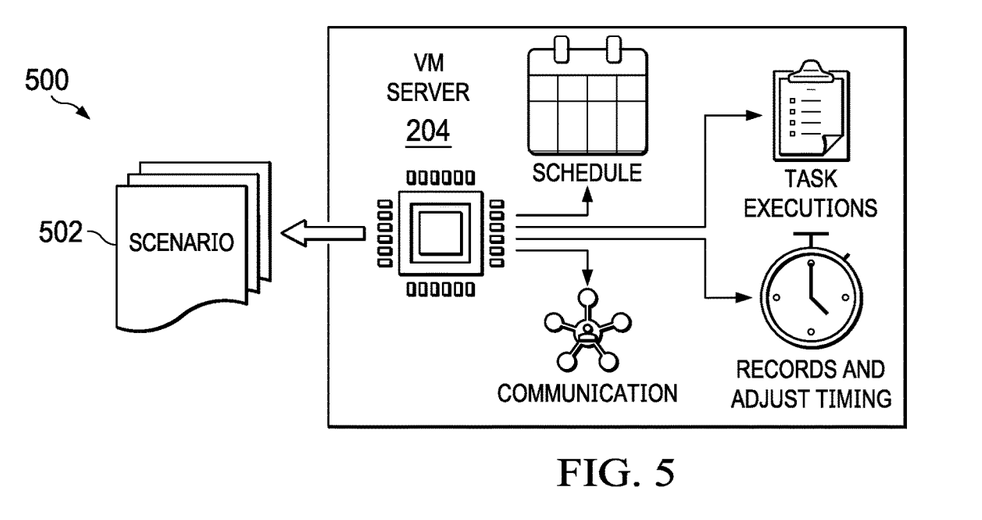
FIG. 5 depicts an orchestrator in accordance with an illustrative embodiment.

FIG. 5 depicts an orchestrator in accordance with an illustrative embodiment. Orchestrator 500 might be an example of orchestrator 208 in FIG. 2 and orchestrator 336 in FIG. 3 and allows planning the actions of the data replication tool. A set of tasks to be executed according to criteria such as time and validation can be organized as a scenario 502. Orchestrator 500 can manage communication of planned actions, schedule actions based on date, and validate and control whether a particular scenario 502 can continue actions.

Orchestrator 500 allows the system administrator to manage scenarios through the integrated UI (i.e. UI 320). Orchestrator 500 can also resume a scenario after a server failure.

Figure 6:
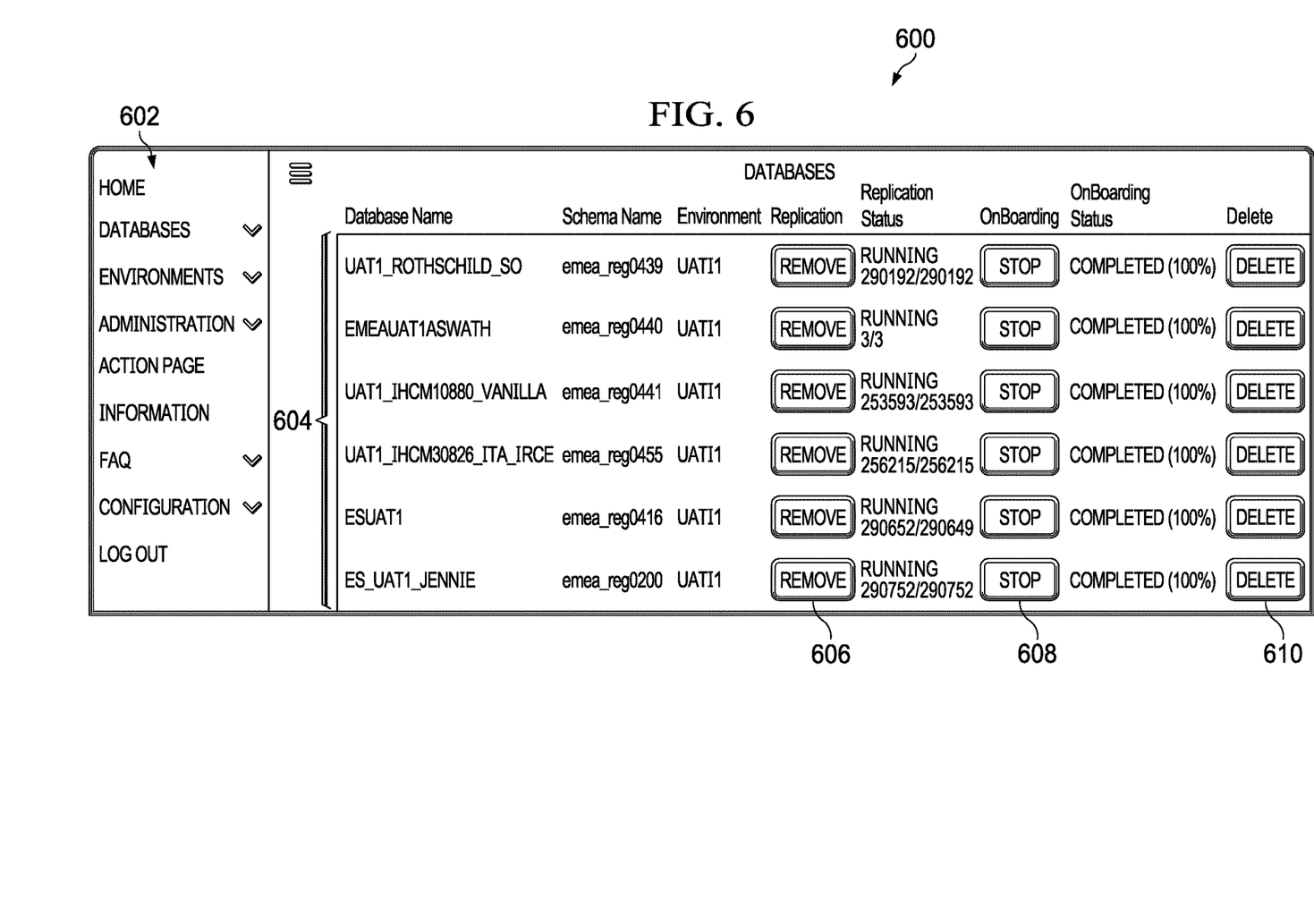
FIG. 6 depicts a user interface in accordance with an illustrative embodiment.

FIG. 6 depicts a user interface in accordance with an illustrative embodiment. UI 600 might be an example of UI 212 in FIG. 2 and UI 320 in FIGS. 3 and 4.

UI 600 comprises menu 602 that allows the user (i.e. system administrator) to select specific information and actions. In the present example, UI 600 is displaying a list of databases 604 being managed by the data replication tool. This list includes information about the databases 604 including schema, environment, replication status, and onboarding status. It also includes control buttons 606, 608, 610 that allow the user to remove replication, start/stop onboarding, delete the onboarded databases, respectively.

UI 600 directly interacts with the API integrated into the data replication tool and provides an administrative console to perform onboarding and replication actions (start/stop, cancel, setup, etc.), follow live database progressions, and add or delete DDLs.

Figure 7:
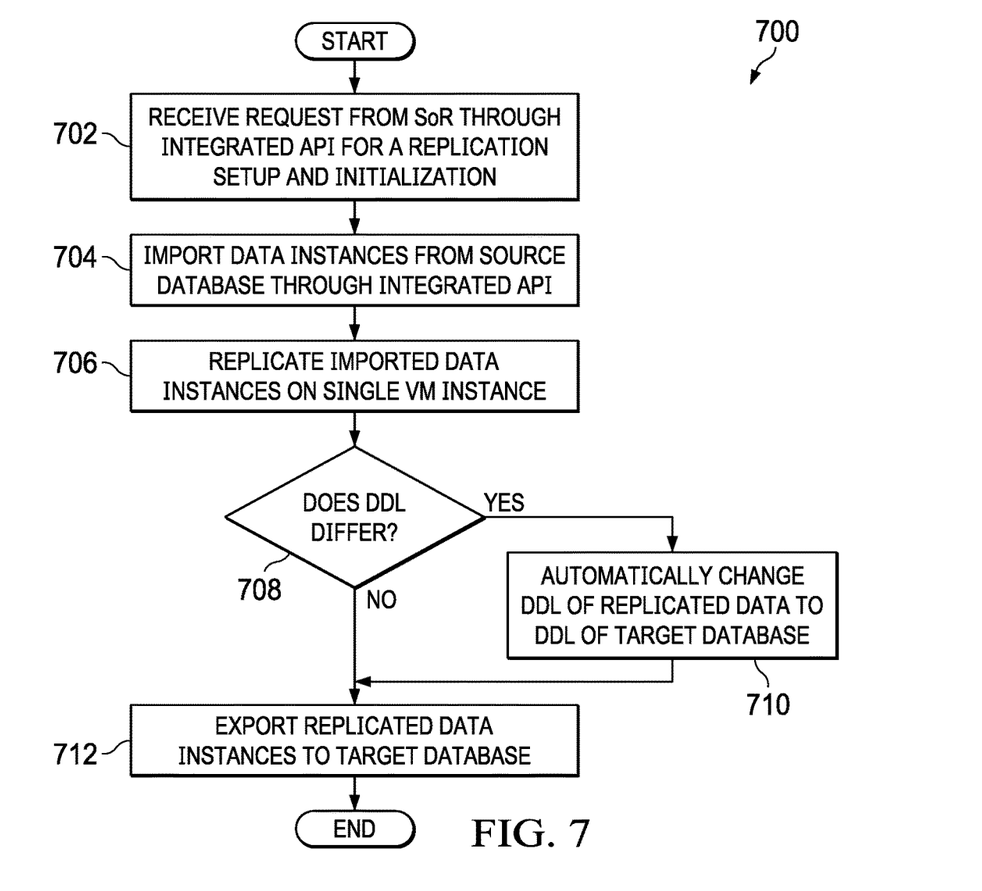
FIG. 7 depicts a flowchart for a process of data replication in accordance with an illustrative embodiment.

FIG. 7 depicts a flowchart for a process of data replication in accordance with an illustrative embodiment. The process in FIG. 7 can be implemented in hardware, software, or both. When implemented in software, the process can take the form of program code that is run by one of more processor units located in one or more hardware devices in one or more computer systems. Process 700 might be implemented in data replication system 200 shown in FIG. 2.

Process 700 begins by receiving, through an API integrated into a data replication tool, a request from a SoR application for a replication setup and initialization (step 702).

The data replication tool imports a number of data instances through the API from a source database associated with the SoR (step 704). The replicated data instances might comprise JSON files.

A manager engine integrated into the data replication tool, initiates a replication process for a separate replication process for each data instance imported through the API (step 706). The manager engine is configured to support multiple data instances on a single virtual machine instance. The manager engine might also detect if a table in the replicated data instances requires a load.

The data replication tool determines if there is a difference between a data description language (DDL) of the replicated data instances and a DDL of a target database (step 708). If a difference is detected, the data replication tool automatically changes the DDL of the replicated data instances to the DDL of the target database (step 710). The data replication tool engine might also automatically translate a table in the replicated data instance to a new structure. A translation model might be stored as SQL in a database. The translation model ensures how exactly the target should receive the information. The model might be built by the SoR or target owner, or it can be directly created by the data replication tool. Alternatively, the data replication tool can adapt the replication on the fly without a translational model.

If there is no difference in DDL between the source database and target database, or after the DLL has been changed in step 710, the data replication tool exports the replicated data instances to the target database (step 712). Process 700 then ends.

Figure 8:
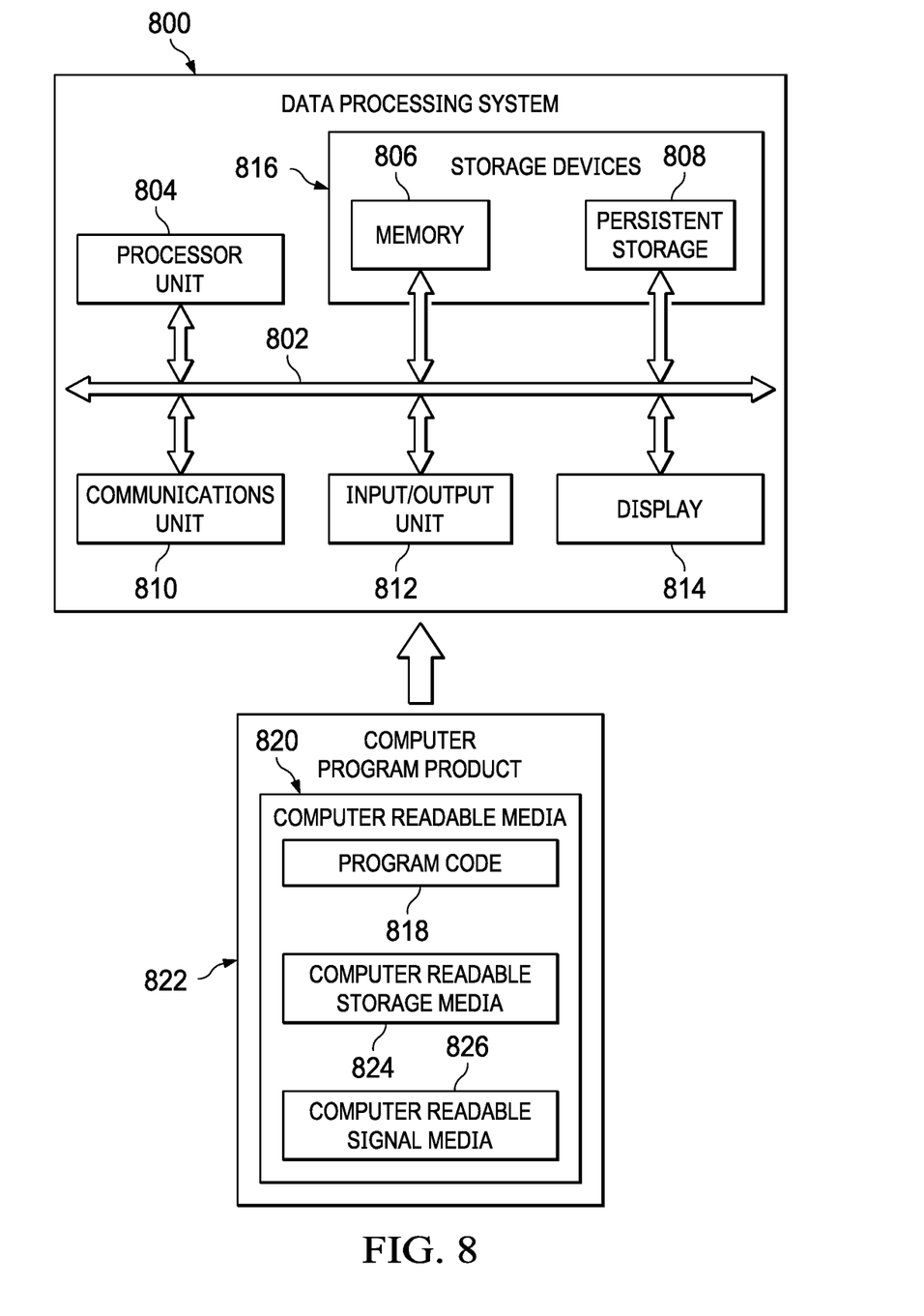
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 1300 may be used to implement one or more computers shown in FIG. 1 (e.g., client devices 110 and server computers 104, 106) and data replication system 200 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. In an embodiment, processor unit 804 comprises one or more conventional general-purpose central processing units (CPUs). In an alternate embodiment, processor unit 804 comprises one or more graphical processing units (CPUs).

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 816, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808. Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Computer readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 818 may be transferred to data processing system 800 using computer-readable signal media 826. Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for data replication, comprising:
one or more processors, coupled with memory, to:
import, through an application programming interface (API), a first plurality of data instances from a source database associated with a system of record (SoR) application;
filter, based on a scope defined by a user, the first plurality of data instances to generate a second plurality of data instances;
automatically execute, using a data replication tool, responsive to filtering the first plurality of data instances based on the scope defined by the user, an individual data replication process for each data instance of the second plurality of data instances at a scheduled time slot to generate a plurality of replicated data instances;
push, responsive to the automatic execution of the individual data replication process for each data instance of the second plurality of data instances at the scheduled time slot, a status of each data instance of the second plurality of data instances to a live stream chat integrated with the data replication tool;
detect, responsive to pushing the status of each data instance of the second plurality of data instances to the live stream chat, a difference between a first data description language (DDL) that defines a structure of a first replicated data instance of the plurality of replicated data instances and a second DDL that defines a structure of a target database;
identify, responsive to detection of the difference between the first DDL and the second DDL, a model, stored as a query language, built to translate the first DDL to the second DDL;
translate, using the identified model, the first DDL of the first replicated data instance to match the second DDL of the target database;
export, based on the translation of the first DDL to match the second DDL, the first replicated data instance to the target database; and
persist, using the API responsive to exporting the first replicated data instance to the target database, database configuration information in a non-relational database, wherein the database configuration information comprises at least one of a status of the target database, an owner of the target database, a last time a last action has been performed with the target database, an indication of a user that performed the last action.

2. The system of claim 1, wherein the one or more processors are further configured to display the API through a user interface.

3. The system of claim 1, wherein the one or more processors are further configured to manage the first replicated data instance through a user interface integrated with the API.

4. The system of claim 1, wherein the one or more processors are further configured to display, via a user interface, a plurality of databases including the source database and the target database and a plurality of control buttons, wherein each database of the plurality of databases corresponds to a control button of the plurality of control buttons.

5. The system of claim 4, wherein the one or more processors are further configured to receive, from the SoR through the API, a replication start or a replication stop request responsive to receiving a user input selecting a control button of the plurality of control buttons corresponding to the source database or the target database.

6. The system of claim 1, wherein the one or more processors are further configured to translate a first structure of the first replicated data instance to a second structure based on the model.

7. The system of claim 1, wherein the API executes on a container that emulates a computer system.

8. The system of claim 1, wherein the one or more processors are further configured to support multiple data instances of the first plurality of data instances on a container, wherein the container emulates a computer system.

9. A method for data replication, comprising:
importing, by one or more processors, coupled with memory, through an application programming interface (API), a first plurality of data instances from a source database associated with a system of record (SoR) application;
filtering, by the one or more processors based on a user defined scope, the first plurality of data instances to generate a second plurality of data instances;
automatically executing, by the one or more processors, using a data replication tool, responsive to filtering the first plurality of data instances based on the user defined scope, an individual data replication process for each data instance of the second plurality of data instances at a scheduled time slot to generate a plurality of replicated data instances;
pushing, by the one or more processors, responsive to automatically executing the individual data replication process for each data instance of the second plurality of data instances at the scheduled time slot, a status of each data instance of the second plurality of data instances to a live stream chat integrated with the data replication tool;
detecting, by the one or more processors, responsive to pushing the status of each data instance of the second plurality of data instances to the live stream chat, a difference between a first data description language (DDL) that defines a structure of a first replicated data instance of the plurality of replicated data instances and a second DDL that defines a structure of a target database;
identifying, by the one or more processors responsive to detection of the difference between the first DDL and the second DDL, a model, stored as a query language, built to translate the first DDL to the second DDL;
translating, by the one or more processors using the identified model, the first DDL of the first replicated data instance to match the second DDL of the target database;
exporting, by the one or more processors based on the translation of the first DDL to match the second DDL, the first replicated data instance to the target database; and
persisting, by the one or more processors using the API responsive to exporting the first replicated data instance to the target database, database configuration information in a non-relational database, wherein the database configuration information comprises at least one of a status of the target database, an owner of the target database, a last time a last action has been performed with the target database, an indication of a user that performed the last action.

10. The method of claim 9, further comprising displaying, by the one or more processors, the API through a user interface.

11. The method of claim 9, further comprising managing, by the one or more processors, the first replicated data instance through a user interface integrated with the API.

12. The method of claim 9 further comprising displaying, by the one or more processors via a user interface, a plurality of databases including the source database and the target database and a plurality of control buttons, wherein each database of the plurality of databases corresponds to a control button of the plurality of control buttons.

13. The method of claim 12, further comprising receiving, by the one or more processors from the SoR through the API, a replication start or a replication stop request responsive to receiving a user input selecting a control button of the plurality of control buttons corresponding to the source database or the target database.

14. The method of claim 9, further comprising translating, by the one or more processors, a first structure of the first replicated data instance to a second structure based on the model.

15. The method of claim 9, wherein the API executes on a container that emulates a computer system.

16. The method of claim 9, further comprising supporting, by the one or more processors, multiple data instances of the first plurality of data instances on one container, wherein the container emulates a computer system.

17. A non-transitory, computer readable medium storing processor executable instructions that, when executed by one or more processors, cause the one or more processors to:
- import, through an application programming interface (API), a first plurality of data instances from a source database associated with a system of record (SoR) application;
- filter, based on a user defined scope, the first plurality of data instances to generate a second plurality of data instances;
- automatically execute, using a data replication tool, responsive to filtering the first plurality of data instances based on the user defined scope to generate the second plurality of data instances, an individual data replication process for each data instance of the second plurality of data instances at a scheduled time slot to generate a plurality of replicated data instances;
- push, responsive to the automatic execution of the individual data replication process for each data instance of the second plurality of data instances at the scheduled time slot, a status of each data instance of the second plurality of data instances to a live stream chat integrated with the data replication tool;
- detect, responsive to pushing the status of each data instance of the second plurality of data instances to the live stream chat, a difference between a first data description language (DDL) that defines a structure of a first replicated data instance of the plurality of replicated data instances and a second DDL that defines a structure of a target database;
- identify, responsive to detection of the difference between the first DDL and the second DDL, a model, stored as a query language, built to translate the first DDL to the second DDL;
- translate, using the identified model, the first DDL of the first replicated data instance corresponding to the user defined scope to match the second DDL of the target database;
- export, based on the translation of the first DDL to match the second DDL, the first replicated data instance to the target database; and
- persist, using the API responsive to exporting the first replicated data instance to the target database, database configuration information in a non-relational database, wherein the database configuration information comprises at least one of a status of the target database, an owner of the target database, a last time a last action has been performed with the target database, an indication of a user that performed the last action.

18. The computer readable medium of claim 17, wherein the one or more processors are further configured to manage the first replicated data instance through a user interface integrated with the API.

* * * * *